Patented May 4, 1926.

1,583,709

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER FILM AND COMPOSITION FOR MAKING THE SAME.

No Drawing. Application filed June 20, 1925. Serial No. 38,564.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Films and Compositions for Making the Same, of which the following is a full, clear, and exact specification.

This invention relates to cellulose ether films and compositions for use in making the same. One object of the invention is to provide a cellulose ether film which will be highly resistant to deterioration by heat, and yet will have other qualities desirable in a film for photographic purposes. Another object of the invention is to provide a composition by means of which such films can be made in the usual processes and apparatus. Other objects will hereinafter appear.

In U. S. Patent No. 1,188,376, Lilienfeld, June 20, 1916, there are disclosed a series of alkyl ethers of cellulose. Certain of these are particularly insoluble in water, and the present invention finds its chief value in ethers having that property, although it is not restricted to them. When such ethers are made into films for different purposes, such as photographic supports or protective coatings or artificial fibers, it is desirable, under circumstances which are met with in practice, that they withstand prolonged heating without becoming brittle. Whether or not films will have this property can be foretold with reasonable accuracy by testing samples, say by heating them for weeks and even months at a continuous temperature of 65° C. If the film is usefully flexible after such a severe test, it is ordinarily capable of withstanding the conditions met with when it is used.

I have found that films and equivalent fabrications of cellulose ether maintain their flexibility under the above described test if they are maintained alkaline by the presence in them of inorganic alkalies. I have also found that flowable compositions, suitable for the preparation of such films by the usual methods, can be prepared by incorporating, in the mixture, a suitable amount of such alkali. The proportion of alkali in the film and in the film-forming composition may be varied considerably. It should be sufficient to create an alkalinity corresponding to a Ph value greater than Ph7 and, where films and lacquers are concerned, it should preferably be insufficient to impair the transparency. The preferred range is between these proportions. Ordinarily, when hydroxides of alkali metals are used, I can employ even up to 1%, based on the weight of the cellulose ether in the compositions and film. About $\frac{1}{10}$ of 1% of the weight of cellulose ether is very useful. Where transparency is desirable, I prefer to use an inorganic alkali which is soluble in the volatile solvents of the film-forming composition and that will not separate out so as to impair the transparency when the cellulose ether is celloidized in the composition or in the film.

I use Ph in reference to hydrogen ion concentration. See "The Determination of Hydrogen Ions" by Clark, published in 1920, by the Williams and Wilkins Company, Baltimore, Maryland.

The alkali may be introduced into the film-forming composition in any suitable way. I have found it convenient to treat cellulose ether, such as water-insoluble ethyl cellulose, with a final soaking in a 10% caustic aqueous soda solution, say in the proportion of 1 part of ether to 10 to 20 parts of solution. This distributes the alkali throughout the entire particles of the ether. Then the cellulose ether is washed with water until it remains faintly alkaline. It is then dried and the alkali will be found evenly distributed in it. After drying it may be dissolved in any of the customary solvents.

Alkali may also be added, while dissolved in an organic solvent, directly to the film-forming mixture. Thus I may dissolve 100 parts of water-insoluble ethyl cellulose in 495 parts of a mixture of benzol and ethyl alcohol (say 165 parts of benzol and 330 parts of ethyl alcohol). Into this mixture I add 1 part of an alcoholic solution of potassium or sodium hydroxide, say a 10% solution. When the mass is sufficiently homogeneous by proper mixing, and after filtration, if necessary, there remains a flowable composition of dope suitable for manufacture of films.

Other substances of high boiling point, which impart additional suppleness or incombustibility or other qualities to the film, may be added to the dope, such, for instance, as triphenyl or tricresyl phosphate, monochlornaphthalene, camphor, etc.

When this dope is spread upon a suitable surface and the volatile ingredients allowed to evaporate, there is produced a transparent flexible film, which throughout its mass is slightly alkaline,—that is, it has an alkalinity in excess of Ph7. This film, when stripped from the surface and cured or otherwise treated in the usual way, is a suitable support for sensitive photographic layers, such as gelatino-silver-halid emulsions, the usual substratum or other intervening layer being employed.

When these alkaline films are heated under severe tests, say at 65° C., for weeks and even months, they maintain their flexibility to a remarkable extent,—that is, to an extent much greater than do similar films which are insufficiently alkaline. My alkaline films remain flexible long after similar non-alkaline films have become brittle under parallel conditions.

Having thus described my invention, what I claim as new and desire to secure by Letters Patent is:

1. As an article of manufacture, a film which maintains its flexibility after prolonged heating at 65° C., comprising colloidized cellulose ether having distributed therein sufficient inorganic alkali to give the film an alkalinity in excess of Ph7.

2. As an article of manufacture, a transparent film, which maintains its flexibility after prolonged heating at 65° C., comprising colloidized cellulose ether having uniformly distributed therein sufficient inorganic alkali to give the film an alkalinity in excess of Ph7, the amount of alkali being insufficient to impair the transparency of the film.

3. As an article of manufacture, a transparent film, which maintains its flexibility after prolonged heating at 65° C., comprising colloidized cellulose ether having distributed uniformly therein caustic alkali of the order of magnitude of $\frac{1}{10}\%$ of the weight of cellulose ether.

4. As an article of manufacture, a film, which maintains its flexibility after prolonged heating at 65° C., comprising colloidized water-insoluble ethyl cellulose having distributed therein inorganic alkali which gives said film an alkalinity in excess of Ph7.

5. As an article of manufacture a transparent film, which maintains its flexibility after prolonged heating at 65° C., comprising colloidized water-insoluble ethyl cellulose having uniformly distributed therein $\frac{1}{10}\%$ of its own weight of caustic alkali.

6. A composition of matter comprising colloidized cellulose ether, stabilized by the presence therein of inorganic alkali which creates an alkalinity in the composition in excess of Ph7.

7. A composition of matter comprising colloidized cellulose ether and sufficient inorganic alkali to give the composition an alkalinity in excess of Ph7, and a common solvent of said ether and alkali.

8. A composition of matter comprising ethyl cellulose, a high boiling substance which enhances the plasticity of the composition, and sufficient inorganic alkali to give the composition an alkalinity in excess of Ph7.

9. A flowable film-forming composition comprising water-insoluble ethyl cellulose and a high boiling plastifier and sufficient inorganic alkali to give the composition an alkalinity in excess of Ph7, all of said ingredients being dissolved in a common solvent thereof.

10. A flowable film-forming composition comprising water-insoluble ethyl cellulose and a proportion of inorganic alkali of the order of magnitude of $\frac{1}{10}\%$ of the weight of said ethyl cellulose, and a volatile organic solvent of said ingredients.

Signed at Rochester, New York, this 13th day of June, 1925.

WILLIAM R. WEBB.

combustibility or other qualities to the film, may be added to the dope, such, for instance, as triphenyl or tricresyl phosphate, monochlornaphthalene, camphor, etc.

When this dope is spread upon a suitable surface and the volatile ingredients allowed to evaporate, there is produced a transparent flexible film, which throughout its mass is slightly alkaline,—that is, it has an alkalinity in excess of Ph7. This film, when stripped from the surface and cured or otherwise treated in the usual way, is a suitable support for sensitive photographic layers, such as gelatino-silver-halid emulsions, the usual substratum or other intervening layer being employed.

When these alkaline films are heated under severe tests, say at 65° C., for weeks and even months, they maintain their flexibility to a remarkable extent,—that is, to an extent much greater than do similar films which are insufficiently alkaline. My alkaline films remain flexible long after similar non-alkaline films have become brittle under parallel conditions.

Having thus described my invention, what I claim as new and desire to secure by Letters Patent is:

1. As an article of manufacture, a film which maintains its flexibility after prolonged heating at 65° C., comprising colloidized cellulose ether having distributed therein sufficient inorganic alkali to give the film an alkalinity in excess of Ph7.

2. As an article of manufacture, a transparent film, which maintains its flexibility after prolonged heating at 65° C., comprising colloidized cellulose ether having uniformly distributed therein sufficient inorganic alkali to give the film an alkalinity in excess of Ph7, the amount of alkali being insufficient to impair the transparency of the film.

3. As an article of manufacture, a transparent film, which maintains its flexibility after prolonged heating at 65° C., comprising colloidized cellulose ether having distributed uniformly therein caustic alkali of the order of magnitude of $\frac{1}{10}$% of the weight of cellulose ether.

4. As an article of manufacture, a film, which maintains its flexibility after prolonged heating at 65° C., comprising colloidized water-insoluble ethyl cellulose having distributed therein inorganic alkali which gives said film an alkalinity in excess of Ph7.

5. As an article of manufacture a transparent film, which maintains its flexibility after prolonged heating at 65° C., comprising colloidized water-insoluble ethyl cellulose having uniformly distributed therein $\frac{1}{10}$% of its own weight of caustic alkali.

6. A composition of matter comprising colloidized cellulose ether, stabilized by the presence therein of inorganic alkali which creates an alkalinity in the composition in excess of Ph7.

7. A composition of matter comprising colloidized cellulose ether and sufficient inorganic alkali to give the composition an alkalinity in excess of Ph7, and a common solvent of said ether and alkali.

8. A composition of matter comprising ethyl cellulose, a high boiling substance which enhances the plasticity of the composition, and sufficient inorganic alkali to give the composition an alkalinity in excess of Ph7.

9. A flowable film-forming composition comprising water-insoluble ethyl cellulose and a high boiling plastifier and sufficient inorganic alkali to give the composition an alkalinity in excess of Ph7, all of said ingredients being dissolved in a common solvent thereof.

10. A flowable film-forming composition comprising water-insoluble ethyl cellulose and a proportion of inorganic alkali of the order of magnitude of $\frac{1}{10}$% of the weight of said ethyl cellulose, and a volatile organic solvent of said ingredients.

Signed at Rochester, New York, this 13th day of June, 1925.

WILLIAM R. WEBB.

Certificate of Correction.

It is hereby certified that in Letters Patent No. 1,583,709, granted May 4, 1926, upon the application of William R. Webb, of Rochester, New York, for an improvement in "Cellulose-Ether Films and Compositions for Making the Same," an error appears in the printed specification requiring correction as follows: Page 1, line 71, for the word "celloidized" read *colloidized;* and that the said Letters Patent should be read with this correction therein that the same may conform to the record of the case in the Patent Office.

Signed and sealed this 13th day of July, A. D. 1926.

[SEAL.]

M. J. MOORE,
*Acting Commissioner of Patents.*

Certificate of Correction.

It is hereby certified that in Letters Patent No. 1,583,709, granted May 4, 1926, upon the application of William R. Webb, of Rochester, New York, for an improvement in "Cellulose-Ether Films and Compositions for Making the Same," an error appears in the printed specification requiring correction as follows: Page 1, line 71, for the word "celloidized" read *colloidized;* and that the said Letters Patent should be read with this correction therein that the same may conform to the record of the case in the Patent Office.

Signed and sealed this 13th day of July, A. D. 1926.

[SEAL.]
M. J. MOORE,
*Acting Commissioner of Patents.*